United States Patent [19]

Toyoshima et al.

[11] Patent Number: 4,939,947
[45] Date of Patent: Jul. 10, 1990

[54] RACK AND PINION TYPE STEERING APPARATUS

[75] Inventors: Hiromitsu Toyoshima; Hirokazu Yoneda; Hiroshi Ueno; Shoji Hatabu, all of Osaka, Japan

[73] Assignee: Koyo Seiko Co., Ltd., Osaka, Japan

[21] Appl. No.: 351,907

[22] Filed: May 15, 1989

[30] Foreign Application Priority Data

May 17, 1988 [JP] Japan .............................. 63-64816[U]

[51] Int. Cl.⁵ .............................................. B62D 3/12
[52] U.S. Cl. ......................................... 74/422; 74/498; 180/148; 384/29
[58] Field of Search ...................... 74/422, 498, 89.17; 180/148; 384/29, 30, 31, 32

[56] References Cited

U.S. PATENT DOCUMENTS

| | | | |
|---|---|---|---|
| 4,400,991 | 8/1983 | Breitweg et al. | 74/498 |
| 4,530,414 | 7/1985 | Fukino et al. | 180/142 |
| 4,593,578 | 6/1986 | Kobayashi et al. | 74/498 |
| 4,683,769 | 8/1987 | Mochizuki et al. | 74/422 |
| 4,800,770 | 1/1989 | Kobayashi et al. | 74/422 |

FOREIGN PATENT DOCUMENTS

| | | | |
|---|---|---|---|
| 59-216764 | 12/1984 | Japan . | |
| 61-25275 | 2/1986 | Japan . | |
| 1556768 | 11/1979 | United Kingdom | 74/422 |

*Primary Examiner*—Allan D. Herrmann
*Assistant Examiner*—Janice E. Chartoff
*Attorney, Agent, or Firm*—Townsend and Townsend

[57] ABSTRACT

A rack and pinion type steering apparatus in accordance with the present invention is provided with a rack guide made of synthetic resin. On the outer periphery of the rack guide is disposed a taper-form rib extending from the topmost portion of both outer sides of a concave one end-surface toward the portion of both outer sides of the other end-surface of the axial direction. The width of the rib becomes greater as it goes from the other end-surface of the axial direction toward one end-surface which is engaged with the back surface of the rack shaft. As a result, the concave portion of the one end-surface of the axial direction is hard to shrink inwardly when being molded, thereby the diameter of the one end-surface of the axial direction and that of the other end-surface of the axial direction of the rack guide are substantially the same.

6 Claims, 4 Drawing Sheets

RACK AND PINION TYPE STEERING APPARATUS

BACKGROUND OF THE INVENTION

1. Field of the Invention

The present invention relates to a rack and pinion type steering apparatus and, more particularly, to improvement of a rack guide thereof.

2. Description of the Prior Art

A rack and pinion type steering mechanism has been used for a steering apparatus of an automobile. In such a steering mechanism, a rack shaft is disposed with a rack guide (a support yoke) on the back of its position engaging with a pinion shaft so that the rack shaft is securely engaged with the pinion shaft. The rack guide is fitted into a guide bore which is provided in the direction perpendicular to the rack shaft in a rack housing, and is supported in the guide bore so that the rack shaft is properly pressed against the pinion shaft by pressure of a spring mounted in the guide bore. FIG. 1 is a plan view of a conventional rack guide and FIG. 2 is a side elevation thereof. The rack guide in the form of a cylinder has on its one end-surface 101 of the axial direction a concave surface engaging with a circumferential surface of the rack shaft as shown in FIGS. 1 and 2. The rack guide which has been made of metal is now superceded by that made of synthetic resin in order to obtain a light-weight apparatus.

However, when the rack guide of synthetic resin is cooled in forming process, the portion of the one end-surface 101 formed to be concave is likely to shrink inwardly as shown in FIG. 3. As a result, there exists a problem that the diameter of the one end-surface 101 becomes smaller than that of the other end-surface 102, consequently, an outer circumference 103 becomes wider as it goes from the one end-surface 101 toward the other end-surface 102, making a taper-form. It has been impossible to solve this problem by adjusting a metal mold. In order to solve this problem, an outer diameter of the whole rack guide, formed by the metal mold, is cooled so that it can be wider than that of its design and that the outer circumference 103 is ground so that the diameter of the one end-surface 101 is equal to that of the other end-surface 102. This method, however, leaves a disadvantage that it requires the grinding process in addition to the forming process. It also leaves another disadvantage that grinding of the outer circumference 103 is so difficult that it leads to lower efficiency of the work.

SUMMARY OF THE INVENTION

The foregoing disadvantages of the prior art are overcome in accordance with the present invention. It is the first object of the invention to provide a rack guide and a rack and pinion type steering apparatus having the rack guide, wherein the rack guide has on its outer periphery a rib formed extending from the topmost portion of both outer sides of a concave one end-surface toward the portion of both outer sides of the other end-surface of the axial direction, making a taper-form so that the topmost portion of the concave one end-surface of the rack guide is prevented from being shrunk inwardly when it is formed, the diameter of the one end-surface and that of the other end-surface of the axial direction being equal.

It is the second object of the invention to provide a rack and pinion type steering apparatus, wherein a protruding contact portion is disposed on the concave one end-surface so that the rack shaft comes in contact with the protruding contact portion and resistance during movement of the rack shaft is decreased, thereby enabling the rack shaft to move smoothly.

In order to accomplish those objects, the rack and pinion type steering apparatus of the invention is provided with a cylindrical rack guide formed of synthetic resin in which one end-surface of the axial direction, elastically contacting the rack shaft so as to press the rack shaft against the pinion shaft, is formed to be a recess engaging with the circumferential surface of the rack shaft. In order to avoid shrinkage of the concave portion of the one end-surface of the axial direction when being formed, the rack guide has on its outer periphery a rib disposed extending from the topmost portion of the both outer sides of the concave one end-surface toward the portion of both outer sides of the other end-surface of the axial direction, making a taper-form. In accordance with the present invention, the rib disposed on the outer periphery of the rack guide is formed extending from the topmost portion of both outer sides of the recessed one end-surface toward the portion of both outer sides of the other end-surface of the axial direction, making a taper-form and the width of the rib becomes greater as it goes from the portion of the other end-surface of the axial direction toward the portion of the one end-surface of the axial direction. As a result, when forming the rack guide, the concave end-surface (one end-surface of the axial direction) is hard to shrink inwardly during cooling, thereby the one end-surface of the axial direction shrinks as much as the other end-surface of the axial direction, allowing those diameters to be the same.

The above and further objects and features of the invention will more fully be apparent from the following detailed description with accompanying drawings.

DESCRIPTION OF THE PREFERRED EMBODIMENTS

Figure 1:
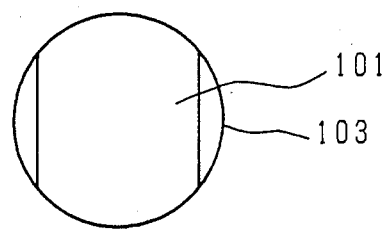
FIG. 1 is a plan view of a rack guide of a steering apparatus of the prior art.
Figure 2:
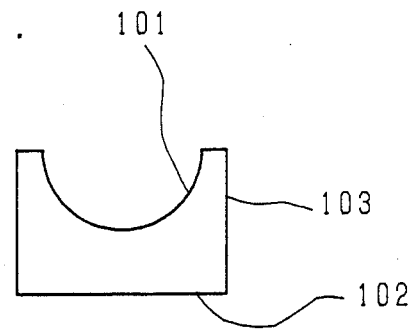
FIG. 2 is a front elevation thereof.
Figure 3:
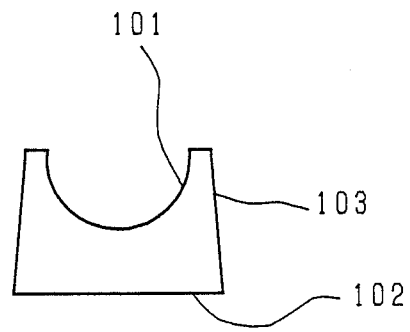
FIG. 3 is a front elevation showing a shrinking condition of the rack guide during being cooled in the manufacturing process.
Figure 4:
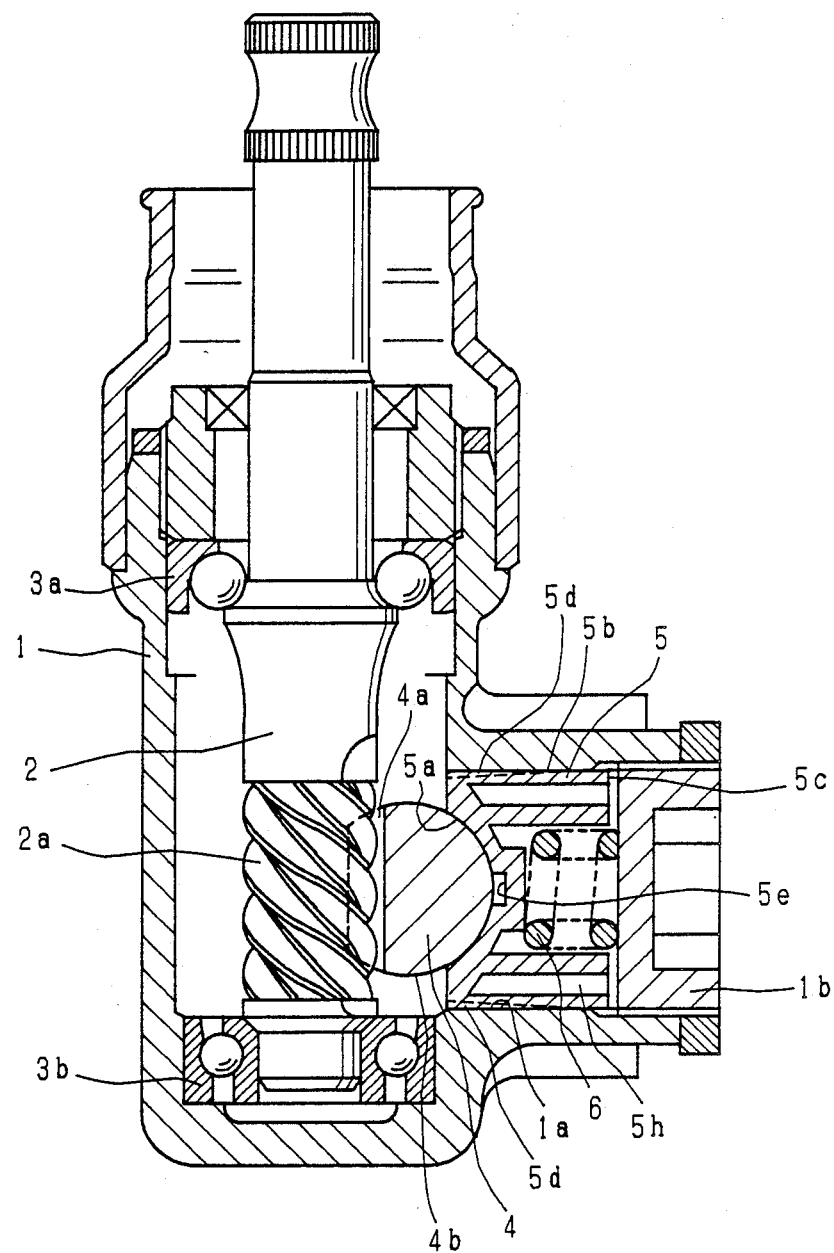
FIG. 4 is a fragmentary vertical section of one embodiment of the steering apparatus in accordance with the present invention.

The present invention will now be described with reference to the drawings. FIG. 4 is a vertical section showing a fragmentary portion of the steering apparatus in accordance with the present invention. A pinion shaft 2, which is connected and cooperated with a steering wheel (not shown) is mounted in a housing 1 and is supported at both sides of a pinion gear 2a thereof by ball bearings 3a and 3b. The pinion gear 2a of the pinion shaft 2 is engaged with a rack gear 4a formed on one surface of a cylindrical rack shaft 4. The rack shaft 4 in the longitudinal direction thereof is positioned in the right and left direction of an automobile (not shown) so as to be connected with the right and the left wheels (not shown) through a ball joint, a link material and the like (all not shown) arranged in both ends thereof, respectively. In conformity with the rotation of the steering wheel, the engaging position of the pinion shaft 2 with the rack shaft 4 changes and the rack shaft 4 moves longitudinally, thereby enabling it to steer the right and left wheels.

Figure 5:
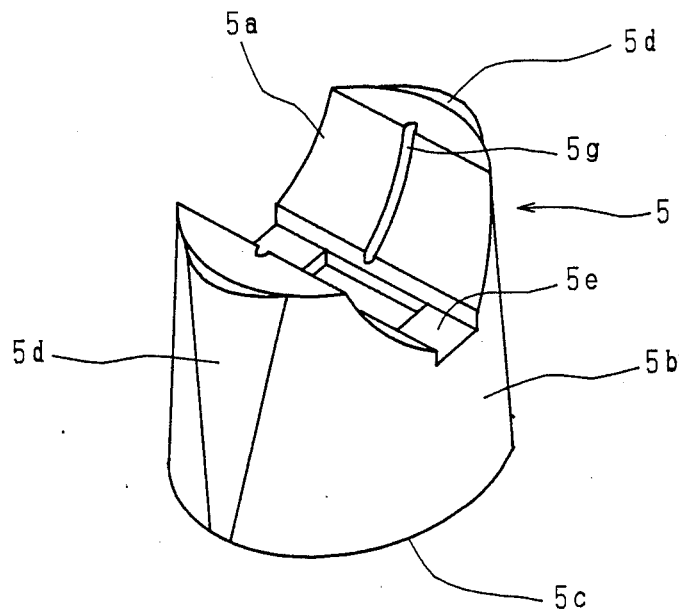
FIG. 5 is a perspective view of the rack guide in accordance with the invention.
Figure 6:
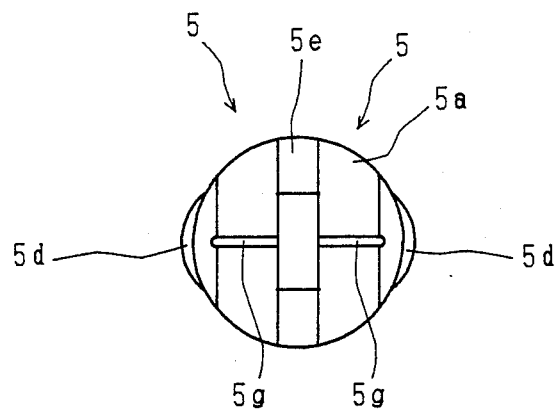
FIG. 6 is a plan view thereof.
Figure 7:
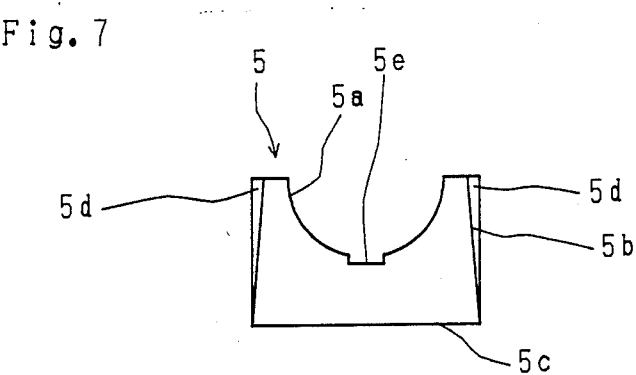
FIG. 7 is a front view thereof.
Figure 8:
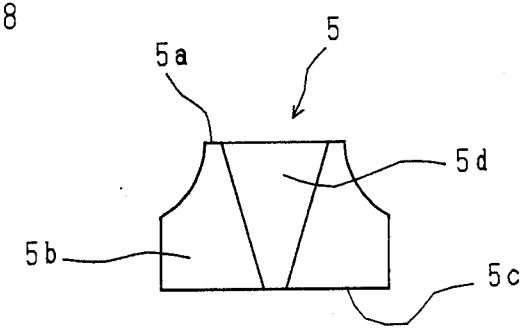
FIG. 8 is a side elevation thereof.

The rack shaft 4 has on the back of its engaging position with the pinion shaft 2 in the housing 1 a guide bore 1a in the direction perpendicular to the rack shaft 4. Into the guide bore 1a is fitted a cylindrical rack guide 5 made of synthetic resin having a configuration as shown in the perspective view of FIG. 5. In the rack guide 5, one end-surface 5a of the axial direction in the side of the rack shaft 4 is formed to be a concave surface engaging with a circumferential surface 4b of the rack shaft 4. By biasing force of a spring 6 fitted between a sealing material 1b, which is engaged in the outer portion of the housing 1 of the guide bore 1a, and the interior of the rack guide 5, the one end-surface 5a of the axial direction abuts the rack shaft 4 so as to press the rack shaft 4 against the pinion shaft 2 side, thereby enabling them to maintain their stable engagement. The rack guide 5 also has on its outer periphery 5b ribs 5d which are formed extending from the topmost portion of both outer sides of the concave one end-surface 5a toward the portion of both outer sides of the other end-surface 5c of the axial direction, making a taper-form. In the most recessed portion of the concave one end-surface 5a of the rack guide 5, there are provided with a recessed groove 5e extending radially and kerfs 5g for oil dripping which extend from the topmost portion of the concave surface toward the most recessed portion.

The rack guide 5 is also provided with a peripheral recessed-bore 5h in the interior of the radial direction from the other end-surface of the axial direction 5c almost near to the concave one end-surface 5a. As a result, lighter weight and the uniform molding of the rack guide may be obtained without deformation while being molded.

As described above, the rack guide 5 has on its outer periphery 5b the ribs 5d extending from the topmost portion of both outer sides of the concave one end-surface 5a toward the portion of the both outer sides of the other end-surface 5c of the axial direction, making a taper-form. The widths of the ribs 5d become greater as they go from the portion of the other end-surface 5c of the axial direction toward the portion of one end-surface 5a of the axial direction. When the rack guide is molded and cooled, the concave end-surface (one end-surface of the axial direction) 5a is hard to shrink inwardly. As a result, the one end-surface 5a of the axial direction and the other end-surface 5c of the axial direction shrink equally, thereby making the diameter of the one end-surface 5a of the axial direction to be the same as that of the other end-surface 5c of the axial direction.

When the rack guide 5 is fitted into the guide bore 1a in the housing 1, only the ribs 5d of the rack guide 5 are fitted into the inner surface of the guide bore 1a. As a result, there exist an advantage that their contacting area can be smaller.

In accordance with the present invention as described above, the rack guide has on its outer periphery ribs formed extending from the topmost portion of both outer sides of the concave one end-surface toward the portion of both outer sides of the other end-surface of the axial direction, making a taper-form. Since the width of the rib becomes greater as it goes from the other end-surface of the axial direction toward the one end-surface of the axial direction, the concave surface of the one end-surface of the axial direction is prevented from shrinking when it is molded, thereby the diameter of the one end-surface of the axial direction can be the same as that of the other end-surface of the axial direction. In addition, since the rib comes in substantially linear-contact with a rack bore, the rack guide can be smoothly moved in the direction of pressing the rack shaft between the rack bores, thereby the rack shaft is guided with proper pressure at all times.

Figure 9:
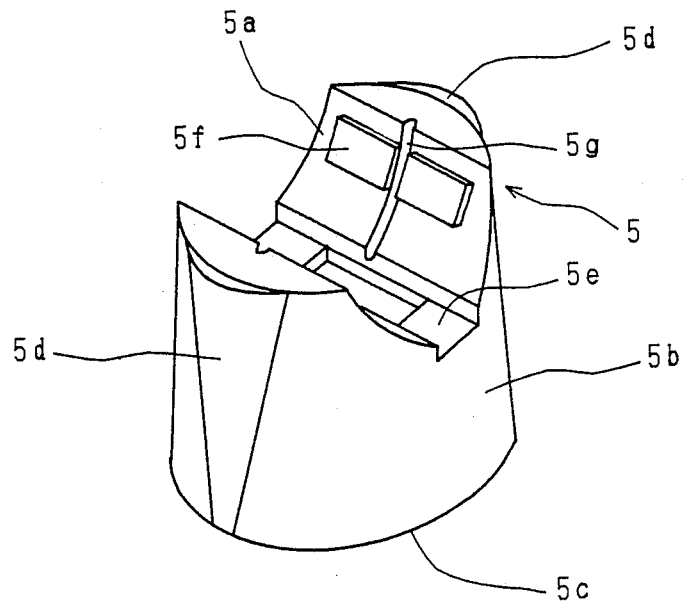
FIG. 9 is a perspective view of the rack guide in accordance with another embodiment.

Another embodiment in accordance with the invention is now be described below. FIG. 9 is a perspective view taken from the outward appearance of the rack guide of another embodiment.

In this embodiment, on halfway up a concave surface, there are provided with protruding contact portions 5f each having a curved surface in sliding-contact with a circumferential surface 4b of the rack shaft 4 in parallel relationship with the recessed groove 5e. The other arrangements of the embodiment will be omitted here since they are the same as those of the first embodiment. As aforementioned, the protruding contact portions 5f in the form of curved-surface plate are provided on the concave end-surface 5a and only the curved surface of the protruding contact portions 5f is fitted into the circumferential surface 4b of the rack shaft 4. Thus, there is an advantage that resistance during movement of the rack shaft 4 in the axial direction is reduced, enabling the rack shaft 4 to move smoothly.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A rack and pinion type steering apparatus comprising:
    a rack shaft with a circumferential surface which is engaged with a pinion shaft;
    a housing which houses said rack shaft, wherein a bore is formed at a first side with no rack of said rack shaft in the direction perpendicular to said rack shaft; and
    a cylindrical rack guide made of synthetic resin, which has taper-form ribs, is loosely fitted into said bore, has a first end surface in an axial direction formed to be a recess being contacted by the circumferential surface of said rack shaft, and is biased in order to press said rack shaft against the pinion shaft,
    said taper-form ribs extending from a topmost portion of both outer sides of said first end surface of said rack guide toward a second end surface in the axial direction of said rack guide.

2. A rack and pinion type steering apparatus as set forth in claim 1, wherein said rack guide has on the first end surface thereof a protruding contact portion engaging with the circumferential surface of said rack shaft.

3. A rack and pinion type steering apparatus as set forth in claim 1, wherein said rack guide has on said second end surface thereof a groove in a circumferential direction having a depth extending from said second end surface toward the first end surface, reaching substantially near to said first end surface.

4. A rack guide as set forth in claim 1, wherein said rack guide has on the first end surface thereof a protruding contact portion engaging with the circumferential surface of said rack shaft.

5. A cylindrical rack guide made of synthetic resin, which is biased in order to press a rack shaft against a pinion shaft, and has a first end surface in an axial direction formed to be a recess being contacted by a circumferential surface of said rack shaft comprising:
 a taper-form rib formed on an outer periphery thereof extending from a topmost portion of both outer sides of said first end surface of said rack guide toward a second end surface in the axial direction of said rack guide.

6. A rack guide as set forth in claim 5, wherein said rack guide has on said second end surface thereof a groove in a circumferential direction having a depth extending from said second end surface toward said first end surface, reaching substantially near to said first end surface.

* * * * *